United States Patent
Jiang

(10) Patent No.: US 10,482,024 B2
(45) Date of Patent: Nov. 19, 2019

(54) PRIVATE CACHING FOR THREAD LOCAL STORAGE DATA ACCESS

(71) Applicant: ALIBABA GROUP HOLDING LIMITED, George Town, Grand Cayman (KY)

(72) Inventor: Xiaowei Jiang, San Mateo, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 104 days.

(21) Appl. No.: 15/655,711

(22) Filed: Jul. 20, 2017

(65) Prior Publication Data
US 2019/0026228 A1    Jan. 24, 2019

(51) Int. Cl.
G06F 12/00        (2006.01)
G06F 12/0888      (2016.01)
G06F 12/084       (2016.01)
G06F 12/0811      (2016.01)
G06F 12/0842      (2016.01)
(Continued)

(52) U.S. Cl.
CPC ........ *G06F 12/0888* (2013.01); *G06F 12/084* (2013.01); *G06F 12/0811* (2013.01); *G06F 12/0842* (2013.01); *G06F 12/0846* (2013.01); *G06F 12/1009* (2013.01); *G06F 12/1027* (2013.01); *G06F 2212/1021* (2013.01); *G06F 2212/1024* (2013.01); *G06F 2212/1028* (2013.01); *G06F 2212/1041* (2013.01); *G06F 2212/62* (2013.01)

(58) Field of Classification Search
CPC .............. G06F 12/0888; G06F 12/084; G06F 2212/62; G06F 2212/1028; G06F 2212/1041; G06F 2212/1024; G06F 12/1027; G06F 12/1009; G06F 2212/1021
See application file for complete search history.

(56) References Cited

U.S. PATENT DOCUMENTS

| 8,495,323 B1 | 7/2013 | Tatavarty |
| 2008/0022049 A1* | 1/2008 | Hughes ................ G06F 12/084 711/130 |

(Continued)

OTHER PUBLICATIONS

Ballapuram, "Exploiting Access Semantics and Program Behavior to Reduce Snoop Power in Chip Multiprocessors," ASPLO'S 08, Mar. 1-5, 2008 Seattle, Washington, U.S.A. (10 pages).

(Continued)

*Primary Examiner* — Tasnima Matin
(74) *Attorney, Agent, or Firm* — Finnegan, Henderson, Farabow, Garrett & Dunner, LLP

(57) ABSTRACT

A multi-core CPU includes a Last-Level Cache (LLC) interconnected with a plurality of cores. The LLC may include a shared portion and a private portion. The shared portion may be shared by the plurality of cores. The private portion may be connected to a first core of the plurality of cores and may be exclusively assigned to the first core. The first core may be configured to initiate a data access request to access data stored in the LLC and initiate a data access request to access data stored in the LLC. The first core may route the data access request to the private portion based on the determination that the data access request is the TLS type of access request and route the data access request to the shared portion based on the determination that the data access request is not the TLS type of access request.

26 Claims, 7 Drawing Sheets

(51) Int. Cl.
  *G06F 12/0846* (2016.01)
  *G06F 12/1009* (2016.01)
  *G06F 12/1027* (2016.01)

(56) References Cited

U.S. PATENT DOCUMENTS

| | | | |
|---|---|---|---|
| 2008/0046736 A1* | 2/2008 | Arimilli | G06F 12/0888 |
| | | | 713/176 |
| 2009/0271572 A1 | 10/2009 | Hughes et al. | |
| 2010/0095300 A1* | 4/2010 | West | G06F 9/5016 |
| | | | 718/104 |
| 2011/0145501 A1 | 6/2011 | Steely, Jr. et al. | |
| 2011/0145506 A1 | 6/2011 | Cherukuri et al. | |
| 2015/0067259 A1 | 3/2015 | Wang et al. | |
| 2015/0067369 A1* | 3/2015 | Henry | G06F 1/04 |
| | | | 713/323 |
| 2015/0120998 A1* | 4/2015 | Wang | G06F 12/084 |
| | | | 711/106 |
| 2015/0169453 A1 | 6/2015 | Shanbhogue et al. | |
| 2015/0347297 A1* | 12/2015 | Hagersten | G06F 12/0862 |
| | | | 711/119 |
| 2016/0283376 A1* | 9/2016 | Reed | G06F 12/084 |
| 2017/0177365 A1 | 6/2017 | Doshi et al. | |

OTHER PUBLICATIONS

PCT International Search Report and Written Opinion dated Sep. 26, 2018, issued in corresponding International Application No. PCT/US2018/042918 (9 pages).

\* cited by examiner

C 11

```
include <threads.h> thread_local int foo=0;
```

C++ 11

```
thread_local int foo=0;
```

*FIG. 3*

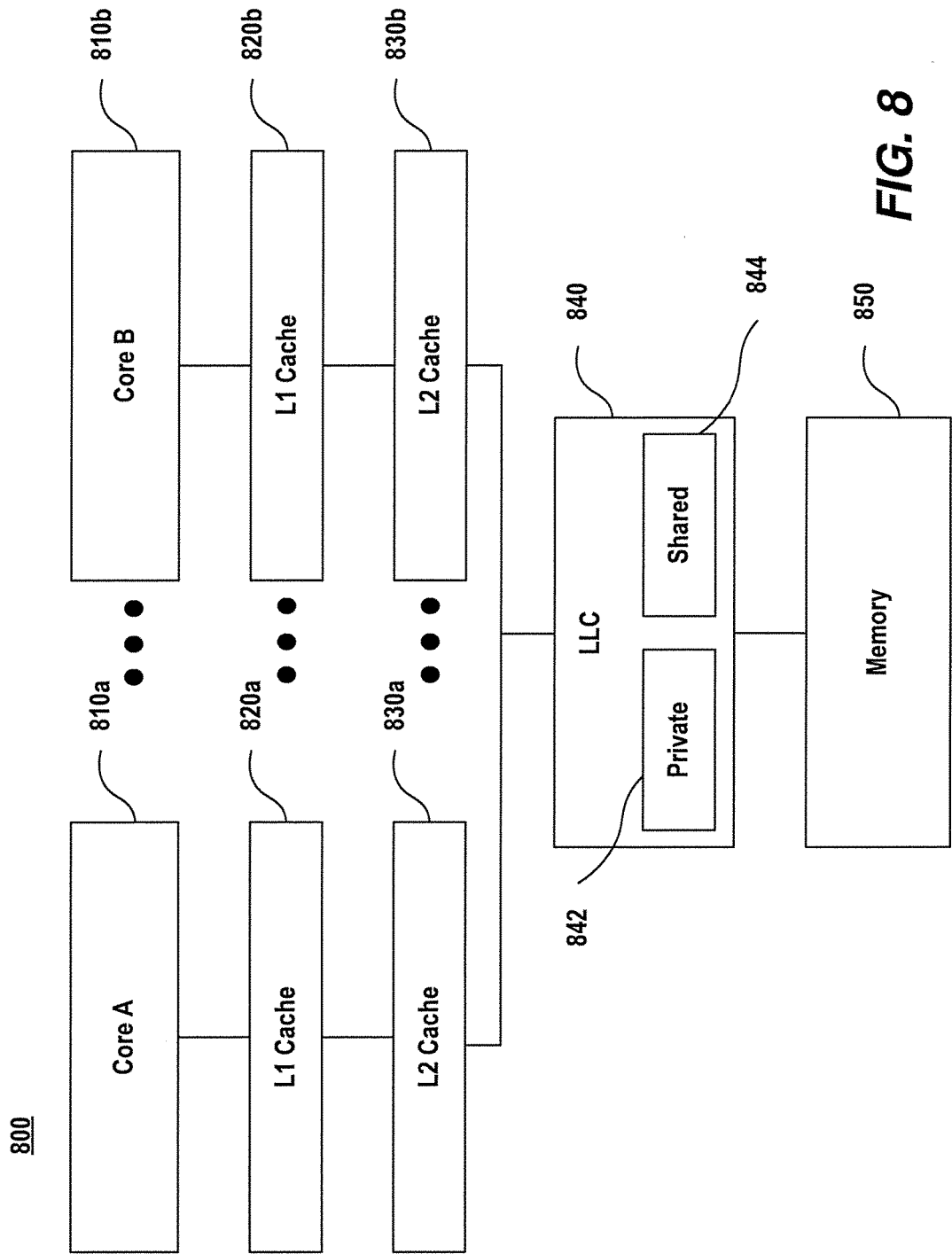

US 10,482,024 B2

PRIVATE CACHING FOR THREAD LOCAL STORAGE DATA ACCESS

TECHNICAL FIELD

The present application relates to computer architecture, and more particularly, to central processing units (CPUs) having private caches for thread local storage (TLS) type of data access and data accessing methods performed by such CPUs utilizing the private caches.

BACKGROUND

Commercial CPUs, such as a CPU designed based on the x86 architecture, usually adopts a hierarchical caching structure between CPU core(s) and the main memory (e.g., a dynamic random-access memory (DRAM)). The caching structure may include multiple levels of caches, ranging from fast but small (i.e., low storage capacity) lower level caches to slow but large (i.e., high storage capacity) higher level caches. Data accessing (e.g., loading/reading data from the memory or storing/writing data to the memory) is performed by the CPU through the multi-level caches to reduce latency and improve data accessing speed. For example, when the CPU performs a read/load operation, the CPU first seeks a copy of the data in the lowest level cache. If the copy is found (also referred to as a "hit"), then the CPU fetches the copy from the lowest level cache without reaching out to the higher level caches or the main memory. If the copy is not found in the lowest level cache (also referred to as a "miss"), then the CPU seeks the copy in the next, higher level cache, and repeats the process through all levels of caches. If the data is not found in all levels of caches, the CPU then fetches the data from the main memory.

Among the multiple level of caches, the last-level cache (LLC) is usually at the third level in the x86 architecture so it may also be referred to as an L3 cache. An LLC usually has a few tens of megabytes (MBs) in size, and causes relatively long access latency compared to the lower level caches (e.g., level-one (L1) and level-two (L2) caches). In existing commercial (e.g., off-the-shelf) multi-core CPUs, the LLC is usually split into smaller slices and distributed and interconnected among multiple CPU cores. For example, each slice is attached to one core. A single piece of data is stored in a distributed manner across multiple slices, and thus across multiple cores. This design allows the entire LLC capacity to be shared by multiple cores. But it also increases the LLC hit latency and increases power consumption. This is because a CPU core has to undergo multiple hops to fetch portions of the same piece of data from LLC slices attached to other cores, regardless of whether the data is private to a single core or not. The multiple hops cause latency and consume power, which are significant considering the accumulating effect in a data center environment where hundreds of thousand CPUs operating all of the time.

SUMMARY

In some aspects, the present disclosure is directed to a CPU. The CPU may include a plurality of cores. The CPU may also include an LLC interconnected with the plurality of cores. The LLC may include a shared portion and a private portion. The shared portion may be shared by the plurality of cores. The private portion may be connected to a first core of the plurality of cores and may be exclusively assigned to the first core. The first core may be configured to initiate a data access request to access data stored in the LLC. The first core may also be configured to determine whether the data access request is a Thread Local Storage (TLS) type of access request based on an annotation associated with the data access request. In addition, the first core may be configured to route the data access request to the private portion based on the determination that the data access request is the TLS type of access request, and route the data access request to the shared portion based on the determination that the data access request is not the TLS type of access request.

In some other aspects, the present disclosure is directed to a method, performed by a CPU including a plurality of cores, of accessing data stored in an LLC interconnected with the plurality of cores. The method may comprise initiating a data access request and determining whether the data access request is a TLS type of access request based on an annotation associated with the data access request. The method may also include routing the data access request to a private portion of the LLC in response to the determination that the data access request is the TLS type of access request. The private portion is connected to a first core and exclusively assigned to the first core. The method may further include routing the data access request to a shared portion of the LLC when in response to the determination that the data access request is not the TLS type of access request. The shared portion is shared by the plurality of cores.

In further aspects, the present disclosure is directed to a data processing system. The data processing system may include a memory storing data and a processor including a plurality of cores. The processor may be coupled to the memory through multiple levels of caches. The multiple levels of caches may include an LLC. The LLC may include a shared portion and a private portion. The shared portion may be shared by the plurality of cores. The private portion may be connected to a first core of the plurality of cores and may be exclusively assigned to the first core. The first core may be configured to initiate a data access request to access data stored in the LLC. The first core may also be configured to determine whether the data access request is a TLS type of access request based on an annotation associated with the data access request. In addition, the first core may be configured to route the data access request to the private portion based on the determination that the data access request is the TLS type of access request, and route the data access request to the shared portion based on the determination that the data access request is not the TLS type of access request.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

FIG. 3 shows exemplary annotations indicating a TLS type of data access, according to some embodiments of the present application.

FIG. 8 shows an exemplary data processing system, according to some embodiments of the present application

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

As described in the Background section, in commercial x86 CPUs the entire storage capacity of the LLC is shared among multiple cores. Accessing data private to a single core in such a design is unnecessarily slow and also consumes extra power due to the multiple hops the accessing signal has to undergo. The solution disclosed in the present application provides local LLC caching for TLS data, which are most likely or even guaranteed to be private to a single core. TLS type of data accesses also represent the majority of private data accesses. Therefore, by reducing interconnect traffic among the cores, the disclosed solution can improve CPU performance by reducing data access latency, and reduce power consumption.

Figure 1:
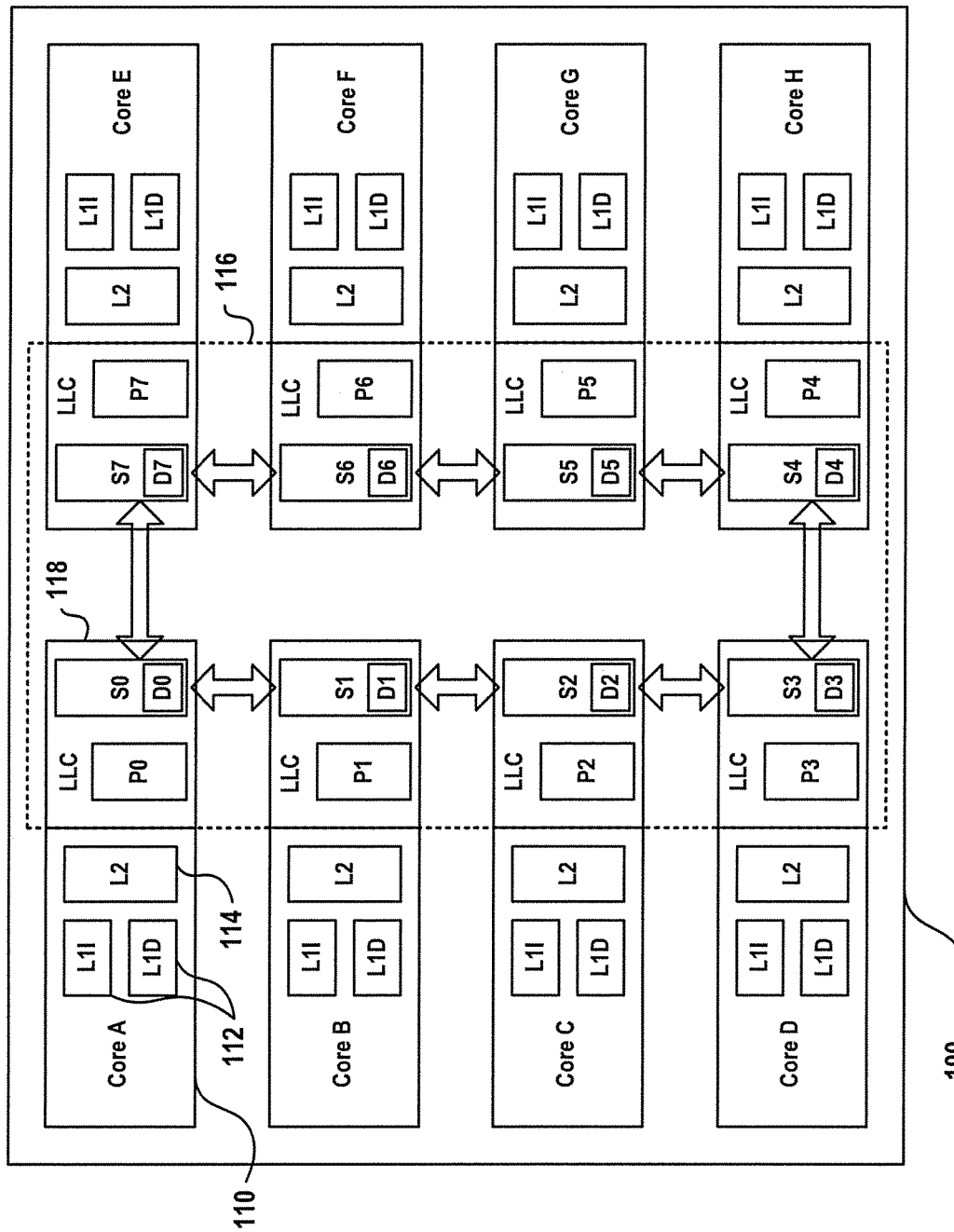
FIG. 1 is a schematic diagram of an exemplary CPU having multiple cores, according to some embodiments of the present application.

FIG. 1 is a schematic diagram of an exemplary CPU 100, in accordance with some embodiments disclosed in this application. CPU 100 may include a plurality of cores, such as cores A, B, . . . , H. Other embodiments may include less than or more than eight cores. CPU 100 may also be referred to as a multi-core CPU. A multi-core CPU refers to a single computing component with two or more independent actual processing units, each of the independent actual processing unit is called a core. A CPU core can read and execute program instructions, such as add, move data, branch, etc., similar to a single-core CPU. One benefit of the multi-core CPU is that it can run multiple instructions on separate cores at the same time, increasing overall speed for programs amenable to parallel computing. Such programs may implement parallel computing through multithreading techniques, in which small sequence of programmed instructions (called "threads") can be executed concurrently on multiple cores.

Program instructions and data can be stored in a memory, such as the main memory of a computer system including a dynamic random-access memory (DRAM). A CPU, such as CPU 100, may read instructions and data from the memory, execute the instructions and/or process the data based on the instructions, and/or write the execution results or processed data back to the memory. However, the operation speed of the memory is usually much slower than the operation speed of the CPU. Therefore, if every data accessing operation such as read/load and write/store is from the memory, the CPU has to wait for the completion of the data accessing operation in order to process the data or proceed to the next instruction, causing a huge latency. To alleviate this program, multiple levels of caches are added between the CPU and the memory, ranging from small (in terms of storage capacity) but fast lower level caches that are closer to the CPU side to the large (in terms of storage capacity) but slow (but sill faster than the speed of the main memory) higher level caches that are closer to the memory side.

FIG. 1 shows an example of this hierarchy of caches. Referring to FIG. 1, three levels of caches are provided to CPU 100. The lowest level cache, referred to as L1 (reference number 112), may be split into two parts: an instruction cache L1I for caching instructions and a data cache L1D for caching data. In other embodiments, an L1 cache may be used for caching both instructions and data without separating the cache into two parts. Higher level caches are usually not split, although such a split design may be used in other embodiments. The next level is referred to as a level 2 cache, or L2 cache, denoted as reference number 114 in FIG. 1. As shown in FIG. 1, both L1 and L2 caches are dedicated to their corresponding core 110 and not shared among the cores. In hardware implementation, L1 cache 112 may be built onto the CPU chip itself, while L2 cache may be built onto the CPU chip or provided as a separate chip. Accordingly, the schematic shown in FIG. 1 should be understood as showing a functional or logical relationship among the components, rather than a physical arrangement or hardware implementation of these components.

The next level cache is referred to as a level 3 cache or L3 cache. In FIG. 1, the L3 cache is the last-level cache (LLC). In some embodiments, LLC may be at an even higher level, such as level 4 ("L4"). The solution disclosed in this application is also applicable to a level 4 LLC or LLC at an even higher level.

The LLC may have a few tens of megabytes (MBs) in size, much larger than that of the L2 cache. Referring to FIG. 1, LLC 116 may be split into smaller slices, each attached to a single core. For example, an LLC slice 118 is attached to core A 110. For simplicity, hereinafter a CPU core is generally referred to as core 110, which may be any core of CPU 100, not necessarily core A. Similarly, L1 and L2 caches are generally referred to as 112 and 114, respectively. For the LLC, reference number 116 refers to the entire LLC while reference 118 refers to an LLC slice, which may be any one slice of the LLC 116, not necessarily the slice attached to core A. As used herein, the term "attach" means logically assigned to. For example, in FIG. 1, LLC slice 118 is logically assigned to core A, which may include connecting to core A with signal lines. While the LLC slices in FIG. 1 are separately drawn to attach to different cores, the entire LLC may be implemented as a single chip with its storage capacity logically divided into slices.

LLC 116 may include a private portion and a shared portion. Referring to FIG. 1, the private portion, as shown in each LLC slice, is denoted as P0, P1, P2, . . . , P7, while the shared portion is denoted as S0, S1, S2, . . . , S7. The shared portion is shared among multiple cores. For example, the shared portion may be distributed and interconnected among the multiple cores. The shared portion may be cache-line interleaved. Therefore, when a data structure D is stored in the shared portion of LLC 116, D is stored in 8 cache lines (D0 through D7), and are distributed and interleaved among all 8 LLC slices. If core A needs to read D4, which is stored in the shared portion S4, the reading operation has to undergo multiple hops (e.g., the round trip of S0-S1-S2-S3-S4-S3-S2-S1-S0) to fetch D4. If D is private to core A, e.g., D is only needed by the thread executed by core A but not other cores, storing D in the shared portion is not efficient.

On the other hand, a private portion of the LLC is connected to a single core and is exclusively assigned to that core. For example, in FIG. 1, private portion P0 is connected to core A and stores data only for core A. The private portion may also be referred to as a local LLC slice. While private caching is efficient in terms of accessing private data, commercial CPUs such as x86 CPUs avoid using private caches due to several reasons: first, caching data in private portions or local LLC slices is in general an inefficient way of utilizing the LLC storage capacity because some threads may demand large cache capacity while others may not utilize the cache space that much; second, private caching also creates a data coherence issue, as the same data may have multiple version separately cached in multiple local LLC slices. Therefore, because commercial CPUs are designed to handle a wide variety of tasks, the advantages of private caching are outweighed by its drawbacks.

In a data center environment, however, commercial CPUs aimed to achieve general applicability are not optimal choices because of the tradeoffs such as omitting the private caches. This is because the minor disadvantage of increased latency and power consumption caused by the multi-hop data accessing operations is amplified by hundreds of thousands or millions of CPUs operating non-stop around the clock. Therefore, to meet the performance and the power consumption requirements, customized CPUs, rather than off-the-shelf CPUs, are preferred. One customization is to include private caching techniques to accelerate the data accessing speed of private data, while maintaining the advantages provided by the shared caches.

Figure 2:
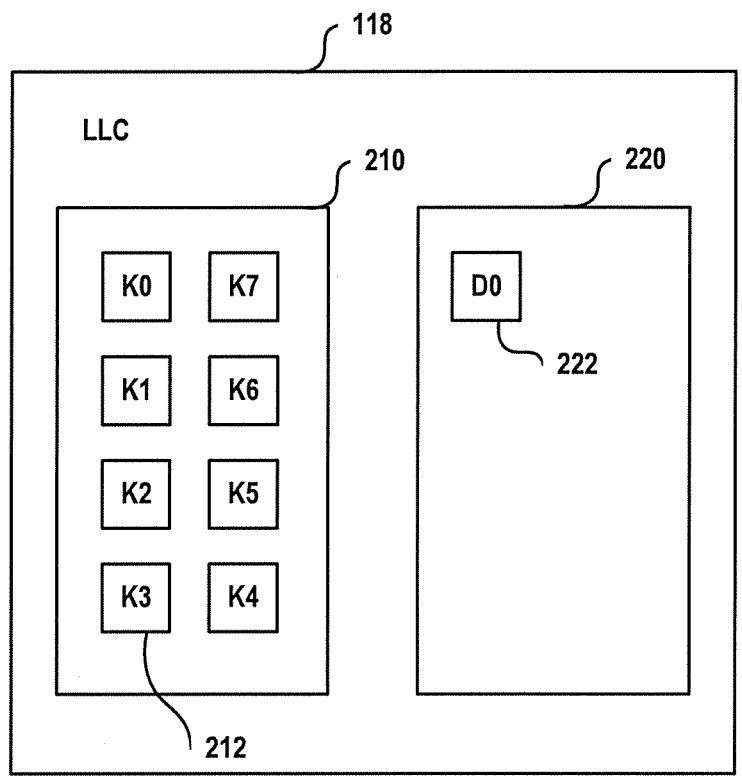
FIG. 2 is a schematic diagram of an exemplary LLC slice including a private portion and a shared portion, according to some embodiments of the present application.

FIG. 2 shows the exemplary LLC slice 118 that includes a private portion 210 and a shared portion 220. Private portion 210 is exclusively assigned to the connected core (core A). Instead of using the cache-line interleaved design as in the shared portion, all cache lines 212 (K0, K1, K2, . . . , K7) are local to private portion 210, whereas only cache line D0 is local to shared portion 220. Accordingly, a data structure private to core A can be stored entirely in the private portion 210 and accessed by core A without traversing the multiple hops as described above in the context of the shared LLC portion(s).

While it is difficult to determine, in general, what kind of data is private to a CPU core, there are certain types of data that are most likely private. For example, a thread local storage (TLS) type of data is most likely to be private to each thread running on a CPU core and is also known to represent the majority of private data. Therefore, embodiments of the present application disclose a CPU cache accessing solution in which a CPU core routes all TLS type of data access requests that miss the L2 cache to the private portion or local slice of the LLC, while routing non-TLS accesses to the shared portion of the LLC. By routing TLS type of data access requests, which are most likely or even guaranteed private to the thread running on a single CPU core, to the private portion of the LLC that is connected to and exclusively assigned to that CPU core, higher performance and lower power consumption can be achieved due to reduced LLC hit latency and reduced interconnect traffic.

In the virtual memory address space, different segments have clear software semantics, which so far have been largely ignored by CPU cache designers. TLS data are designed to be private to the thread, and should not be shared with other threads. At the hardware level, however, TLS data have been treated the same as shared data in other virtual memory regions. For example, in a cache-line interleaved shared LLC, the TLS data have been spread over all the LLC slices. Indeed, since virtual memory information is deprecated after the virtual-to-physical translation completes, existing CPUs cannot differentiate a TLS access versus a non-TLS access to the LLC.

In software languages, TLS is meant to be used by programmers to store data that are private to the thread, or local copy of global data to reduce synchronization overhead. TLS is supported differently in different languages, some languages use annotation to support TLS, while others use APIs or specific classes to support TLS. FIG. 3 shows examples of TLS support in C11 and C++ 11. In C11, TLS is supported by including the header file <threads.h>. Then, a variable can be designated as TLS type using an annotation "thread_local". In C++ 11, annotation "thread_local" has been scandalized as a key word. These program language annotations accompanying the load/store instruction can be used by a complier to differentiate TLS type of data accesses from non-TLS type of data accesses.

Figure 4:
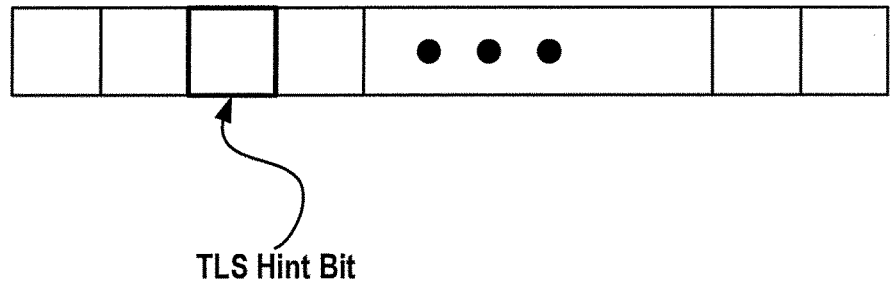
FIG. 4 shows an exemplary TLS hint bit in a translation lookaside buffer (TLB) entry or a page table entry, according to some embodiments of the present application.

Another method can be used instead of or in addition to the software language instruction annotation approach described above. This method requires that a translation lookaside buffer (TLB) entry or a page table entry to have an extra bit for TLS hint, as shown in FIG. 4. In the page fault handler, the kernel may check the faulting virtual address. If it is a TLS access, the TLS hint bit is set to '1' in the new page table entry. Otherwise the TLS hint bit is set to '0'. Note that in FIG. 4, the TLS hint bit can be placed in any suitable location.

Figure 5:
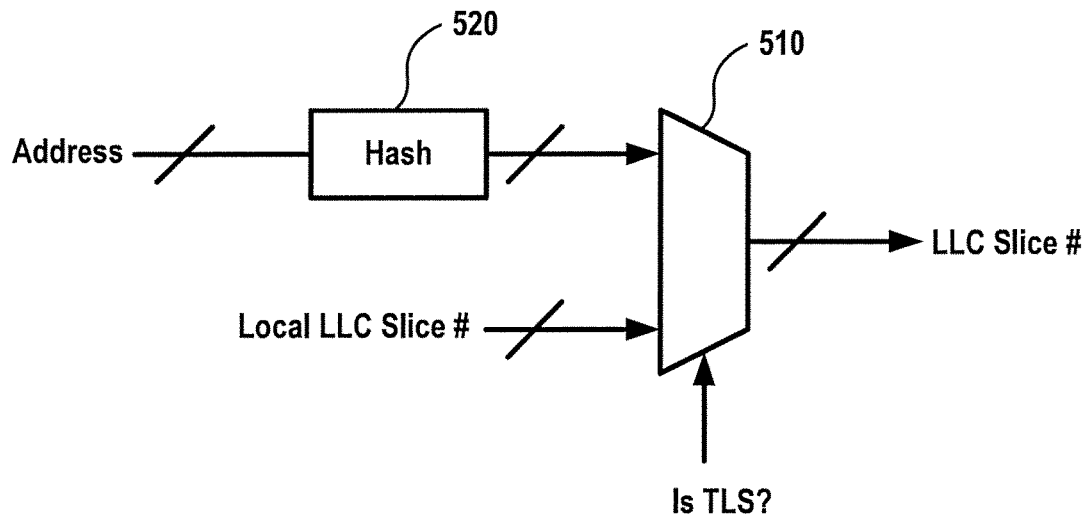
FIG. 5 shows an exemplary LLC selector, according to some embodiments of the present application.

When a memory operation misses the L2 cache, a CPU core accesses the LLC for the data. An LLC selector may be provided to select the appropriate slice based on whether the access request is a TLS type of request. FIG. 5 shows an exemplary LLC selector 510. As described above, a TLS type of access request can be determined based on an annotation associated with the request, and the annotation can include an instruction annotation specified by a program language that is associated with a load instruction or a store instruction, and a TLS hint bit in a TLB/page table entry. In the latter case, every load/store operation may acquire the TLS hint bit from the TLB, and carry it to the LLC selector 510. Selector 510 may select the shared portion as the destination to route the data access request by applying a hashing function 520 to an address portion of the access request. Alternatively, selector 510 may select the private portion as the destination by choosing a local LLC slice as a target LLC slice to route the data access request.

During a thread migration process, such as a thread migration as a result of operation system (OS) job rescheduling, the cached TLS data may be removed or flushed from the private portion of the LLC to avoid the cache coherency issue. This can be done by the OS job scheduler. For example, at job scheduling time, the OS may decide to move thread T from core X to a different core, Y. Just before the OS job scheduler pulls thread T from a waiting queue of core X to a ready queue of core Y, the OS job scheduler may flush the local LLC slice assigned to core X.

The present application also discloses the following method to avoid false hits with CPUs having more than 64 cores. For a CPU with N cores, the LLC selector can use log N bits above the cache line offset to route a memory request to the LLC. None of these log N bits is needed in the cache line tags. When the page size is 4 kilobytes (KB), false hits can happen when N>64.

When N<=64, the log N bits do not overlap with the page number, assuming a page size of 4 KB. Since a TLS address is guaranteed to have a different page number than any non-TLS address, TLS cache lines will not have a same tag as any non-TLS cache lines in a same LLC slice. Therefore, false hits will not happen.

Figure 6:
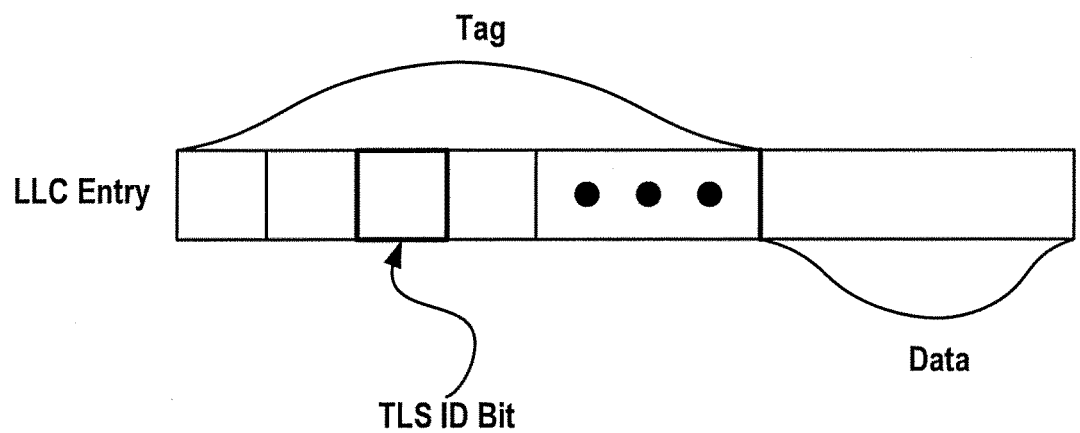
FIG. 6 shows an exemplary TLS identification bit in an LLC entry, according to some embodiments of the present application.

When N>64, the log N bits start to overlap with the page number. Since the overlapping bits are not used in the cache line tags, some TLS addresses may have the same tags as non-TLS addresses, which leads to incorrect LLC hits. To address this problem, a TLS identification bit can be added in the LLC tag to differentiate TLS addresses from non-TLS addresses. FIG. 6 shows an exemplary TLS identification bit added into the tag portion of the LLC entry. This TLS identification bit can also help to implement selective cache flushing. For example, when a thread migrates, only the TLS lines from the old cache slice are flushed, while the non-TLS lines are maintained.

Figure 7:
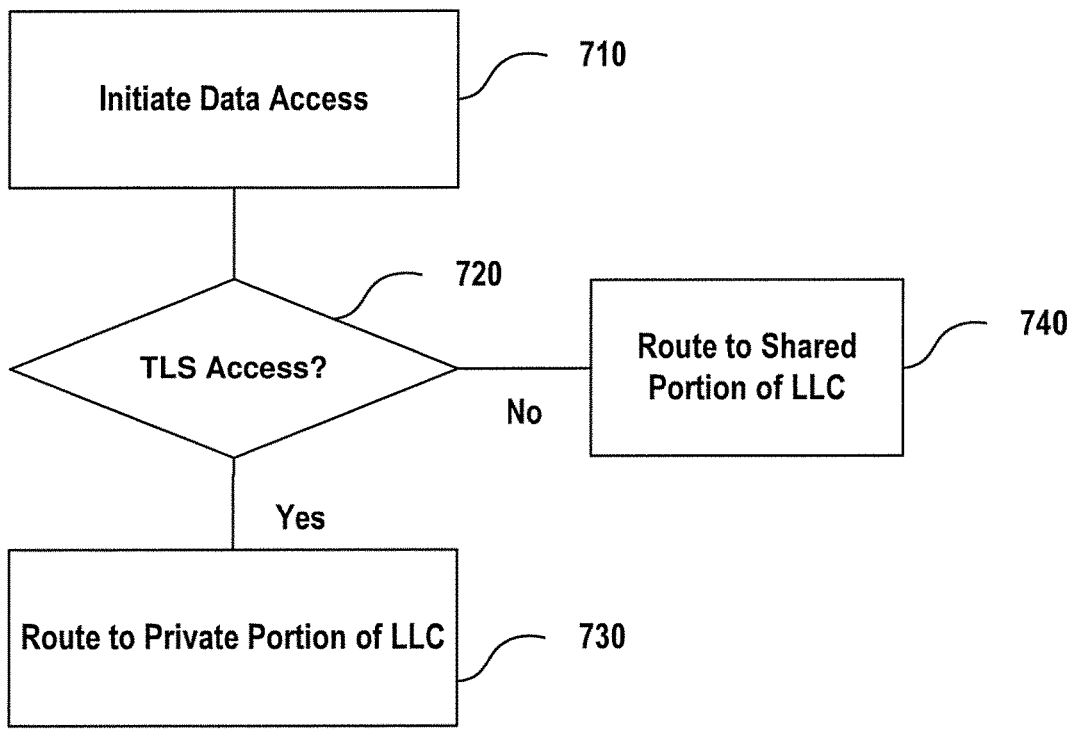
FIG. 7 is a flow chart of an exemplary method of accessing data stored in an LLC, according to some embodiments of the present application.

FIG. 7 is a flow chart of an exemplary method 700 of accessing data stored in an LLC, according to some disclosed embodiment. Method 700 may be performed by a CPU having LLC that includes a private portion and a shared portion, such as CPU 100. In step 710, CPU 100 may initiate a data access request. For example, core A of CPU 100 may initiate a memory operation to read/write data. The request may traverse the L1 cache, and then the L2 cache. Once the request misses the L2 cache, the request may be directed to the LLC. In step 720, CPU 100 may determine whether the data access request is a TLS type of request based on an annotation associated with the request. For example, the annotation may include an instruction annotation such as a "thread_local" specifier provided by C11 or C++ 11. In another example, the annotation may include a TLS hint bit in a page table entry or a TLB entry. Based on the determination that the data access request is a TLS type of request (the Yes branch after step 720), CPU 100 may route the request to the private portion of the LLC. For example, selector 510 may select the local LLC slice as the destination to route the data access request such that the private portion of the LLC (e.g., 210) is selected to receive the request, in step 730. On the other hand, based on the determination that the data access request is not a TLS type of request (the No branch after step 720), CPU 100 may route the request to the shared portion of the LLC. For example, selector 510 may use a baseline hashing function (e.g., 520) to route the request to the shared portion (e.g., 220) of the LLC.

FIG. 8 shows an exemplary data processing system 800. System 800 may include a processor having a plurality of cores (e.g., core A 810*a*, core B 810*b*, etc.). The processor may be coupled with a memory 850 through multiple levels of caches (e.g., L1 cache 820*a*/820*b*, L2 cache 830*a*/830*b*, LLC 840, etc.). LLC 840 may include a private portion 842 and a shared portion 844. As discussed above, private portion 842 may include individual slices that are each connected to a corresponding core and exclusively assigned to that core, while the shared portion may be shared by the plurality of cores. Each core may perform data accessing operations utilizing LLC 840 according to, for example, method 700.

The specification has described multi-core CPUs having private caches for thread local storage (TLS) type of data access and data accessing methods performed by such CPUs utilizing the private caches. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined as long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Embodiments of the present application may be implemented using hardware, software, firmware, or any combination thereof for allowing a specialized device to perform the functions described above. One or more steps, operations, functions, and modules described herein may be implemented by firmware instructions or codes stored in one or more memory devices and executed by one or more hardware processor devices. Exemplary hardware processor devices include logic gate circuitry configured or made to perform data processing and/or logic operations, integrated circuits (ICs) designed and made to perform specific functions, programmable gate arrays (PGAs), field-programmable gate arrays (FPGAs), etc.

Multiple function modules may be integrated into a single physical device, or may be provided in separate physical devices.

It is intended that the disclosure and examples be considered as exemplary only, with a true scope and spirit of disclosed embodiments being indicated by the following claims.

What is claimed is:

1. A central processing unit (CPU), comprising:
   a plurality of cores; and
   a Last-Level Cache (LLC) interconnected with the plurality of cores, the LLC including a shared portion and a plurality of private portions that correspond to the plurality of cores, wherein:
   the shared portion is shared by the plurality of cores,
   a first private portion of the plurality of private portions is connected to a first core of the plurality of cores and is exclusively assigned to the first core, and
   a second private portion of the plurality of private portions is connected to a second core of the plurality of cores and is exclusively assigned to the second core.

2. The CPU of claim 1, wherein the first core is configured to:
   initiate a data access request to access data stored in the LLC;

determine whether the data access request is a Thread Local Storage (TLS) type of access request based on an annotation associated with the data access request;
route the data access request to the first private portion based on the determination that the data access request is the TLS type of access request; and
route the data access request to the shared portion based on the determination that the data access request is not the TLS type of access request.

3. The CPU of claim 2, wherein the annotation includes an instruction annotation associated with a load instruction or a store instruction.

4. The CPU of claim 2, wherein the annotation includes a TLS hint bit of a page table entry or a TLS hint bit of a Translation Lookaside Buffer (TLB) entry.

5. The CPU of claim 2, further comprising an LLC selector configured to select between the shared portion and the first private portion as a destination to route the data access request based on the annotation.

6. The CPU of claim 5, wherein the LLC selector is configured to select the shared portion as the destination to route the data access request by applying a hashing function to an address portion of the data access request.

7. The CPU of claim 5, wherein the LLC selector is configured to select the first private portion as the destination by choosing a local LLC slice of the first private portion as a target LLC slice to route the data access request.

8. The CPU of claim 1, wherein at least one private portion of the plurality of private portions is configured to be flushed during a thread migration process or a job rescheduling process.

9. The CPU of claim 1, comprising less than or equal to 64 cores.

10. The CPU of claim 1, comprising more than 64 cores, and the CPU is configured to:
determine whether an address is a TLS address based on an identification in a tag portion of an LLC entry.

11. A method, performed by a central processing unit (CPU) including a plurality of cores, of accessing data stored in a Last-Level Cache (LLC) interconnected with the plurality of cores, the method comprising:
initiating a data access request;
determining whether the data access request is a Thread Local Storage (TLS) type of access request based on an annotation associated with the data access request;
routing the data access request to a first private portion of the LLC in response to the determination that the data access request is the TLS type of access request, the LLC including a plurality of private portions that correspond to the plurality of cores, the first private portion of the plurality of private portions being connected to a first core and exclusively assigned to the first core, and a second private portion of the plurality of private portions being connected to a second core of the plurality of cores and is exclusively assigned to the second core; and
routing the data access request to a shared portion of the LLC when in response to the determination that the data access request is not the TLS type of access request, the shared portion being shared by the plurality of cores.

12. The method of claim 11 wherein the annotation includes an instruction annotation associated with a load instruction or a store instruction.

13. The method of claim 11, wherein the annotation includes a TLS hint bit of a page table entry or a TLS hint bit of a Translation Lookaside Buffer (TLB) entry.

14. The method of claim 11, further comprising:
selecting, by an LLC selector of the CPU, between the shared portion and the first private portion as a destination to route the data access request based on the annotation.

15. The method of claim 14, further comprising:
applying a hashing function to an address portion of the data access request to select the shared portion as the destination to route the data access request.

16. The method of claim 14, further comprising:
choosing a local LLC slice of the first private portion as a target LLC slice to select the first private portion as the destination to route the data access request.

17. The method of claim 11, further comprising:
flushing at least one private portion of the plurality of private portions during a thread migration process or a job rescheduling process.

18. The method of claim 11, further comprising:
determining whether an address is a TLS address based on an identification in a tag portion of an LLC entry.

19. A data processing system, comprising:
a memory storing data; and
a processor including a plurality of cores, wherein the processor is coupled to the memory through multiple levels of caches;
wherein the multiple levels of caches include a Last-Level Cache (LLC), the LLC including a shared portion and a plurality of private portions that correspond to the plurality of cores, wherein:
the shared portion is shared by the plurality of cores,
a first private portion of the plurality of private portions is connected to a first core of the plurality of cores and is exclusively assigned to the first core, and
a second private portion of the plurality of private portions is connected to a second core of the plurality of cores and is exclusively assigned to the second core.

20. The data processing system of claim 19, wherein the first core is configured to:
initiate a data access request to access data stored in the LLC;
determine whether the data access request is a Thread Local Storage (TLS) type of access request based on an annotation associated with the data access request;
route the data access request to the first private portion based on the determination that the data access request is the TLS type of access request; and
route the data access request to the shared portion based on the determination that the data access request is not the TLS type of access request.

21. The data processing system of claim 20, wherein the annotation includes an instruction annotation associated with a load instruction or a store instruction.

22. The data processing system of claim 20, wherein the annotation includes a TLS hint bit of a page table entry or a TLS hint bit of a Translation Lookaside Buffer (TLB) entry.

23. The data processing system of claim 20, wherein the processor further comprises an LLC selector configured to select between the shared portion and the first private portion as a destination to route the data access request based on the annotation.

24. The data processing system of claim 23, wherein the LLC selector is configured to select the shared portion as the destination to route the data access request by applying a hashing function to an address portion of the data access request.

25. The data processing system of claim 23, wherein the LLC selector is configured to select the first private portion as the destination by choosing a local LLC slice of the first private portion as a target LLC slice to route the data access request.

26. The data processing system of claim 19, wherein at least one private portion of the plurality of private portions is configured to be flushed during a thread migration process or a job rescheduling process.

* * * * *